3 Sheets—Sheet 1.

L. CHAPMAN.

Assignor to THE COLLINS COMPANY.

Dies and Punches for Forming the Eyes of Adzes.

No. 9,007. Reissued Dec. 30, 1879.

Witnesses:
Robt F. Gaylord
Lewis Sperry

Inventor:
L. Chapman
By W. E. Simonds
Atty.

N. PETERS, PHOTO-LITHOGRAPHER, WASHINGTON, D. C.

L. CHAPMAN.
Assignor to THE COLLINS COMPANY.
Dies and Punches for Forming the Eyes of Adzes.
No. 9,007. Reissued Dec. 30, 1879.
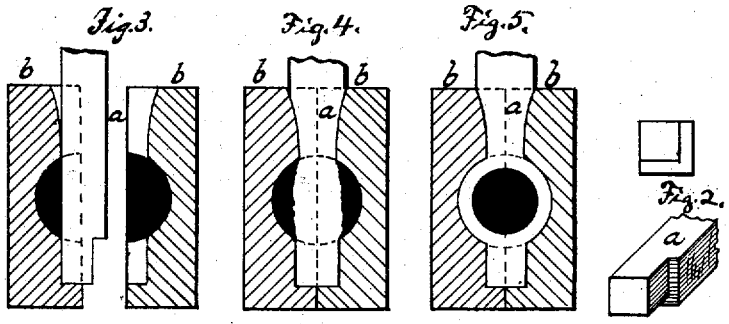
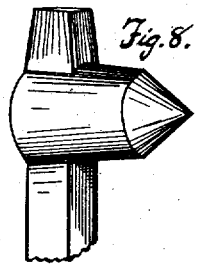
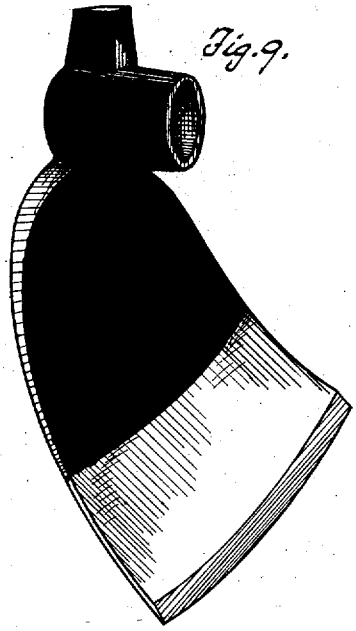
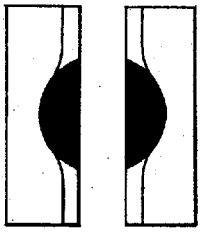
Witnesses:
Robt. F. Gaylord
Lewis Perry
Inventor:
L. Chapman
By W. E. Simonds
Atty.
N. PETERS, PHOTO-LITHOGRAPHER, WASHINGTON, D. C.

L. CHAPMAN.
Assignor to THE COLLINS COMPANY.
Dies and Punches for Forming the Eyes of Adzes.
No. 9,007. Reissued Dec. 30, 1879.
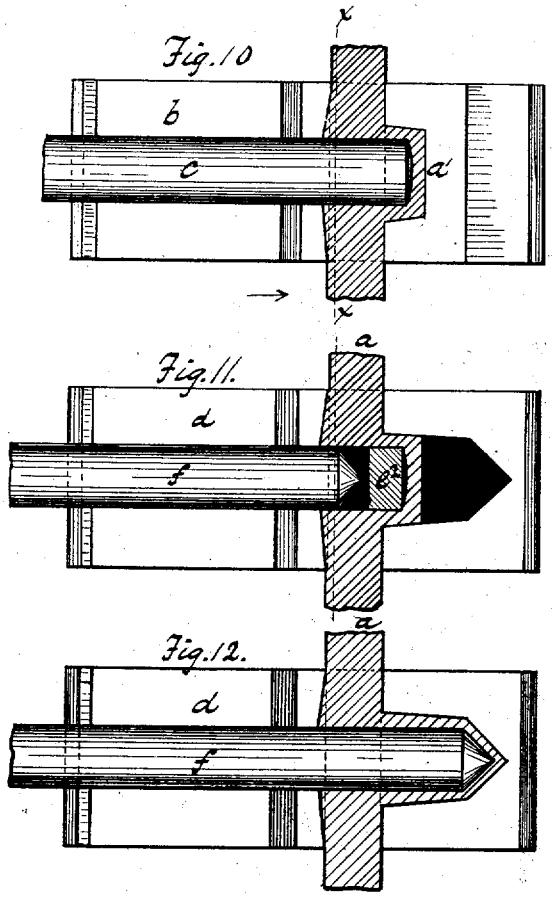
Witnesses:
Robt. F. Gaylord
Lewis Sperry
Inventor:
L. Chapman
By W. E. Simonds
Atty.
N. PETERS, PHOTO-LITHOGRAPHER, WASHINGTON, D. C.

UNITED STATES PATENT OFFICE.

LUKE CHAPMAN, OF COLLINSVILLE, CONNECTICUT, ASSIGNOR TO THE COLLINS COMPANY, OF SAME PLACE.

IMPROVEMENT IN DIES AND PUNCHES FOR FORMING THE EYES OF ADZES.

Specification forming part of Letters Patent No. 172,255, dated January 18, 1876; Reissue No. 9,007, dated December 30, 1879; application filed December 26, 1877.

*To all whom it may concern:*

Be it known that I, LUKE CHAPMAN, of Collinsville, in the county of Hartford and State of Connecticut, have invented certain new and useful improvements pertaining to the manufacture of elongated eyes, circular or oval in cross-section, for adzes, pickaxes, and other tools and articles having similar elongated eyes, of which the following is a specification, reference being had to the accompanying drawings, in which Figures 1, 2, 3, 4, 5, 6, 7, 8, and 9 refer to adzes, and Figs. 10, 11, and 12 to pickaxes, where—

Figure 1:
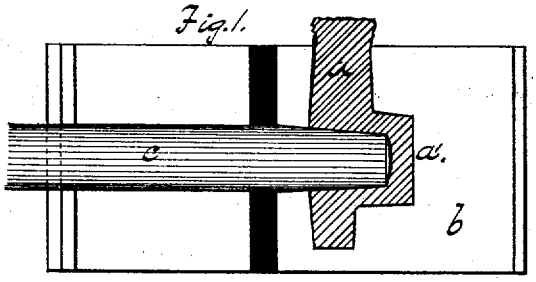
Figure 6:
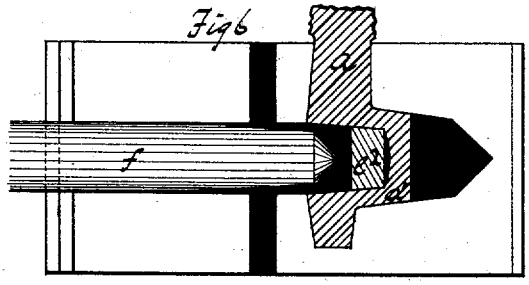
Figure 7:
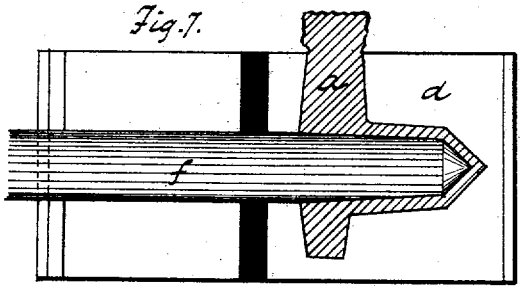

Fig. 1 is a face view of one of the two duplicate dies forming a set, showing a longitudinal section of the bar or stock as operated on by the dies and punch. Fig. 2 is a view of the end of the stock or bar as prepared for insertion into the set of dies, one of which set is shown in Fig. 1. Fig. 3 is a view, in cross-section, on plane *x x* of the set of dies referred to in describing Figs. 1 and 2, showing the stock inserted ready to be operated on. Fig. 3ª is a view in substance the same as Fig. 3, except that the dies shown are for making pick-eyes of a shape approaching an oval, and the outlines of the matrix are modified or changed, so that there are no sharp corners or shoulders at the points where the bar-matrices open into the eye-matrix proper, and no stock-bar is shown. This shape and construction of dies were shown in the model filed with the original application for Letters Patent No. 172,255, dated January 18, 1876. Fig. 4 is a view similar to Fig. 3, except that the dies have closed together. Fig. 5 is a view similar to Fig. 4, except that the punch has done its work, the same as shown in Fig. 1. Fig. 6 is a face view of one of two duplicate dies forming another set, showing the product formed by the set of dies and punch first described, shown in Figs. 1, 3, 4, and 5, inserted and ready to be operated on for the purpose of still further extending and elongating the eye. Fig. 7 is a view similar to Fig. 6, except that the punch belonging to this set of dies has advanced and done its work. Both Figs. 6 and 7 show the stock in longitudinal section. Fig. 8 is a view of the product as it comes from the dies shown in Figs. 6 and 7. Fig. 9 is a view of a completed adz. Fig. 10 is a face view of one of two duplicate dies forming a set for producing the elongated eye on pickaxes, showing a longitudinal section of the stock as operated on by the dies and punch. Fig. 11 is a face view of one of two duplicate dies forming another set for producing the elongated eye on pickaxes, showing the product formed by the set of dies and punch referred to in describing Fig. 10 inserted, ready to be operated on for the purpose of still further extending and elongating the eye. Fig. 12 is a view similar to Fig. 11, except that the punch belonging to this set of dies has advanced and done its work.

These dies are designed for forming elongated eyes, round or oval in cross-section, for adzes, pickaxes, or other tools or articles having similar eyes. Such tools and articles are usually made of iron or steel, or iron and steel. The metal bar or stock to be operated upon is properly heated previous to manipulation.

The bar of metal *a*, of proper size, is first cut into proper lengths, and in adz-making one end may be prepared as shown in Figs. 2 and 3. The bar is then heated and inserted, as shown in Fig. 3. The dies *b b*, worked by appropriate machinery, now close together face to face, as shown in Fig. 4, pinching the bar and compressing it on each side of the matrix, so that, as compared with such pinched or compressed parts, there is an excess or greater thickness of metal within the matrix at the place where the eye is to be formed. The punch *c* now advances and does its work, as shown in Fig. 5, causing the metal to fill the matrix of the dies, and leaving the web *a'* just forward or in front of the punch. The solid bottom of the dies *b* prevents the stock, when flowing forward under the advance of the punch, from finding escape in that direction from the matrix, so that by refluent movement of the stock it is forced to fill and fit the matrix around the punch, and the punch, as shown in Figs. 1, 5, and 10, is carried down, of substantially the full size of the eye to be formed, to at or near its end, thus avoiding the necessity for subsequent punching or broaching to enlarge the eye laterally, (not referring now to subsequent shaping of the eye.)

As before referred to, the dies in their compressing function leave an excess of metal at the place or point where the eye is to be, which place or point may be, for the sake of convenience, termed the "eye-point." To this end it is obviously essential that the stock at the commencement of the operation be large enough to allow said compression.

The eye as now formed is circular or oval in cross-section, according to the shape given to the walls of the matrix and to the punch. The punch now retreats, the dies open, and the stock is taken out.

To attain still further extension and elongation of the eye, the stock is again heated and grasped in the dies *d d*, (which being duplicates, only one of them is shown in the drawings, and that one in Figs. 6 and 7—in the case of the pickax in Figs. 11 and 12—the cross-section of which is the same as in the first set of dies,) which close together face to face, the additional stock-piece $e^2$ having been dropped into the eye before the operation of further extension is commenced. The punch *f* now advances to its work, as shown in Fig. 7—in the case of the pickax as shown in Fig. 12—merging the piece $e^2$ in the surrounding stock and extending the elongation of the eye. The product of this last operation is shown, in the case of the adz, in Fig. 8.

The eye is opened through by sawing off or removing the web left in front of the punch.

Fig. 9 shows the shape into which the adz-forging is finally worked. The blank, in the case of the adz, is made smallest at one end before submission to the dies, so as to have this part of about the same size as the head of the tool which it finally forms, while the body of the stock is left larger, in order to afford the requisite amount of stock for the eye. This small part at the end can be left in the center of the bar, its place in the dies being correspondingly located, if desired; but I prefer it upon one side of the bar, as shown, for two reasons: first, by appliances that I have in use it is easier to make it thus; and, second, when the small part is made centrally of the bar, I find an increased tendency in the metal to flow out between the dies at the joint where the dies meet under the action of the punch. It is true that by this method, which I prefer, the metal is thrown slightly out of its axial center in the matrix of the dies; but this proves to be of no consequence in actual practice.

The process of using the additional stock-piece $e^2$, as herein shown and described, forms the subject-matter of other Letters Patent to me, No. 172,247, dated January 18, 1876.

It will be observed that the stock undergoes two separate operations in the dies *b b*, to wit: first, a compression of the stock, which leaves an excess or greater quantity of metal at the eye-point; and, second, the punching of the eye of substantially its finished size (in cross-section) in a solid die, which forces the stock to fill the matrix by refluent action, leaving a web of stock in front of the punch.

I have other patents of even date with the original patent on which this reissue is based, one numbered 172,256 and another numbered 172,258. The dies and punches shown and described in the former case are for making a solid-head-adz eye, and differ from these herein described, which are for making a common oval or round adz-eye, in the shapes of the matrices of the dies and in the shapes of the punches. Also, the hereinbefore-described dies and punches differ in shape from those shown and described in said Patent No. 172,258, which are designed for making eyes for hoes. In neither patent, Nos. 172,256 and 172,258, does the shape of the die in adz-making require that the stock be made smaller at one end before action. Patent No. 172,256 further differs from this case in showing a cutting-off shoulder, wholly absent in these dies herein described.

The phrase "the finished diametric size" is used in the first clause of the following claim, not to denote that the eye is substantially finished as to its length or elongation, but is substantially as to its diameter.

I claim as my invention—

1. The process of forming a forging for the elongated eye of an adz, pickax, or other tool or article, consisting in submitting the stock-bar to dies, which first compress it so as to leave an excess of metal at the eye-point, and then, in solid-bottomed dies, to the action of a punch, which punches, elongates, and forms the eye, with the exception of a web at the bottom of the eye, of substantially the finished diametric size, all substantially as set forth in the foregoing description of the construction, operation, and manner of using the dies *b b* and punch *c*.

2. The partible dies *b b*, for forming a forging for the elongated eye of an adz or other tool of which the elongated eye or matrix is closed at bottom, in combination with the punch *c*, in virtue of which combination the extremity of the eye is left closed by a web.

3. The combination of the bar-compressing, solid-bottomed, eye-elongating dies *b b* and punch *c* with the dies *d d* and punch *f*, for extending the elongation of the eye, when all are constructed, arranged, and designed for operation and use substantially as hereinbefore shown and described.

LUKE CHAPMAN.

Witnesses:
OLIVER F. PERRY,
GEORGE P. EDWARDS.